United States Patent
Guan et al.

(10) Patent No.: US 11,811,626 B1
(45) Date of Patent: Nov. 7, 2023

(54) TICKET KNOWLEDGE GRAPH ENHANCEMENT

(71) Applicant: International Business Machines Corporation, Armonk, NY (US)

(72) Inventors: Li Li Guan, Beijing (CN); Zhe Yan, Beijing (CN); Rong Zhao, Beijing (CN); Ke Zhang, Beijing (CN); Yuan Jin, Shanghai (CN); Jing Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/832,756

(22) Filed: Jun. 6, 2022

(51) Int. Cl.
*H04L 41/5074* (2022.01)
*G06F 40/30* (2020.01)
*G06N 5/022* (2023.01)

(52) U.S. Cl.
CPC .......... *H04L 41/5074* (2013.01); *G06F 40/30* (2020.01); *G06N 5/022* (2013.01)

(58) Field of Classification Search
CPC ...... H04L 41/5074; G06F 40/30; G06N 5/022
USPC ........................................................ 709/224
See application file for complete search history.

(56) References Cited

U.S. PATENT DOCUMENTS

| | | | |
|---|---|---|---|
| 6,714,939 B2* | 3/2004 | Saldanha | G06F 40/131 707/999.102 |
| 10,475,045 B2 | 11/2019 | Ferrarons Llagostera | |
| 2004/0254781 A1* | 12/2004 | Appleby | G06F 40/45 704/2 |
| 2005/0060301 A1* | 3/2005 | Seki | G06F 16/3329 |
| 2006/0101069 A1* | 5/2006 | Bell | G06F 40/30 |
| 2015/0120738 A1* | 4/2015 | Srinivasan | G06F 16/285 707/739 |
| 2016/0026618 A1* | 1/2016 | Bangalore | G10L 15/26 704/253 |
| 2017/0116616 A1 | 4/2017 | Donatelli | |
| 2017/0242919 A1* | 8/2017 | Chandramouli | G06F 16/3344 |
| 2018/0249193 A1* | 8/2018 | Zhang | H04N 21/26603 |
| 2018/0253736 A1 | 9/2018 | Rajaram | |
| 2020/0004817 A1* | 1/2020 | Kudo | G06F 16/355 |
| 2020/0089766 A1* | 3/2020 | Lassoued | G06F 40/30 |

(Continued)

FOREIGN PATENT DOCUMENTS

CN 113393084 A 9/2021

OTHER PUBLICATIONS

"Intelligent Work Order Knowledge Mining Engine", downloaded from the Internet Apr. 27, 2022, 6 pages, <http://www.kmpro.cn/plus/list.php?tid=205>.

(Continued)

*Primary Examiner* — David P Zarka
(74) *Attorney, Agent, or Firm* — Aaron Pontikos

(57) ABSTRACT

A computer-implemented method includes: extracting, by one or more processors, media data from an information technology ticket; extracting, by one or more processors, a plurality of data elements from the media data; and generating, by one or more processors, a ticket knowledge graph based on the plurality of data elements, wherein a node of the ticket knowledge graph represents a data element, and an edge between a first node and a second node in the ticket knowledge graph represents a correlation between a first data element represented by the first node and a second data element represented by the second node.

17 Claims, 6 Drawing Sheets

(56) References Cited

U.S. PATENT DOCUMENTS

2020/0210463 A1* 7/2020 Gujarathi .............. G06F 40/258
2020/0372415 A1* 11/2020 Mann .................. H04L 41/5074

OTHER PUBLICATIONS

"Is your business facing these issues", Yunna cloud work order intelligent management solution, downloaded from the Internet Apr. 27, 2022, 8 pages, <http://www.easyitom.com/index/fwjg.jsp?i=1>.
"Provide better self-service with knowledge base software", LiveAgent, Knowledge Base Software, downloaded from the Internet Apr. 27, 2022, 21 pages, <https://www.live-agent.cn/zhishi-ku-ruanjian/>.
Mell et al., "The NIST Definition of Cloud Computing", Recommendations of the National Institute of Standards and Technology, NIST Special Publication 800-145, Sep. 2011, 7 pages.

* cited by examiner

500

502 — Assist and Parts Identifier app's is enabled-disabled-enabled in navigator app list when first time use ✎ Edit | ☐ Comment | Assign | More ⌄ | To Do | Researching | Workflow ⌄

504
⌄ Details
Type: ■ Bug
Priority: ⌄ Low
Affects Version/s:
Component/s: Disconnected mode
Labels: None
Sprint:
Severity: Moderate Status: To Do (View Workflow)
Resolution: Unresolved
Fix Version/s: None 506
⌄ Description
when first time MMM mobile app, after login, after load navigator, 'Assist' app is enabled at first time, then disabled (downloading), then enabled again(complete download), if user click 'Assist' at first enabled time, a bad page is shown 'not exist' before its downloaded, get error.

In another word, navigator not disabling the app's fast enough - if user taps in before its downloaded, get error.

Demo video attached. You can reproduce in ivt04.env:' https://masws.home.testing.ivt04.suite. MMM .com/ — 514

508
⌄ Attachments

⊕ Drop files to attach, or browse.

Video ~ 510    Image ~ 512

FIG. 5

TICKET KNOWLEDGE GRAPH ENHANCEMENT

BACKGROUND

The present invention relates to information technology, and more specifically to information technology ticketing systems.

There are many tickets for describing different demands or issues. For example, an epic ticket may be created during the product design phase to describe the product structure to be designed. A story ticket may be created to describe detailed functions or demands of the product described in the epic ticket. A bug ticket may be created during the testing phase to describe bugs associated with a product. Further, a customer demand ticket may be created during the product use phase to describe the customer's demand for the product.

A ticketing system may be used for ticket management, which may include the process of creating, routing, and addressing information technology tickets. A user may create and submit a ticket describing demands or issues to the ticketing system. Tickets submitted to the ticketing system may be routed to suitable departments or persons for subsequent processes, thereby addressing and/or resolving the issues described in the ticket.

SUMMARY

According to one embodiment of the present invention, a computer-implemented method for an information technology ticket management system is disclosed. The computer-implemented method includes extracting, by one or more processors, media data from an information technology ticket. The computer-implemented method further includes extracting, by one or more processors, a plurality of data elements from the media data. The computer-implemented method further includes generating, by one or more processors, a ticket knowledge graph based on the plurality of data elements. A node of the ticket knowledge graph represents a data element, and an edge between a first node and a second node in the ticket knowledge graph represents a correlation between a first data element represented by the first node and a second data element represented by the second node.

According to another embodiment of the present invention, an information technology ticket management system is disclosed. The information technology ticket management system includes one or more computer system includes one or more computer processors, one or more computer readable storage media, and program instructions stored on the computer readable storage media for execution by at least one of the one or more processors. The program instructions include instructions to extract media data from an information technology ticket. The program instructions further include instructions to extract a plurality of data elements from the media data. The program instructions further include instructions to generate a ticket knowledge graph based on the plurality of data elements. A node of the ticket knowledge graph represents a data element, and an edge between a first node and a second node in the ticket knowledge graph represents a correlation between a first data element represented by the first node and a second data element represented by the second node.

According to another embodiment of the present invention, a computer program product for an information technology management system is disclosed. The computer program product includes one or more computer readable storage media and program instructions stored on the one or more computer readable storage media. The program instructions include instructions to extract media data from an information technology ticket. The program instructions further include instructions to extract a plurality of data elements from the media data. The program instructions further include instructions to generate a ticket knowledge graph based on the plurality of data elements. A node of the ticket knowledge graph represents a data element, and an edge between a first node and a second node in the ticket knowledge graph represents a correlation between a first data element represented by the first node and a second data element represented by the second node.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 5 depicts an information technology ticket, generally designated 500, in accordance with at least one embodiment of the present invention.

DETAILED DESCRIPTION

Figure 1:
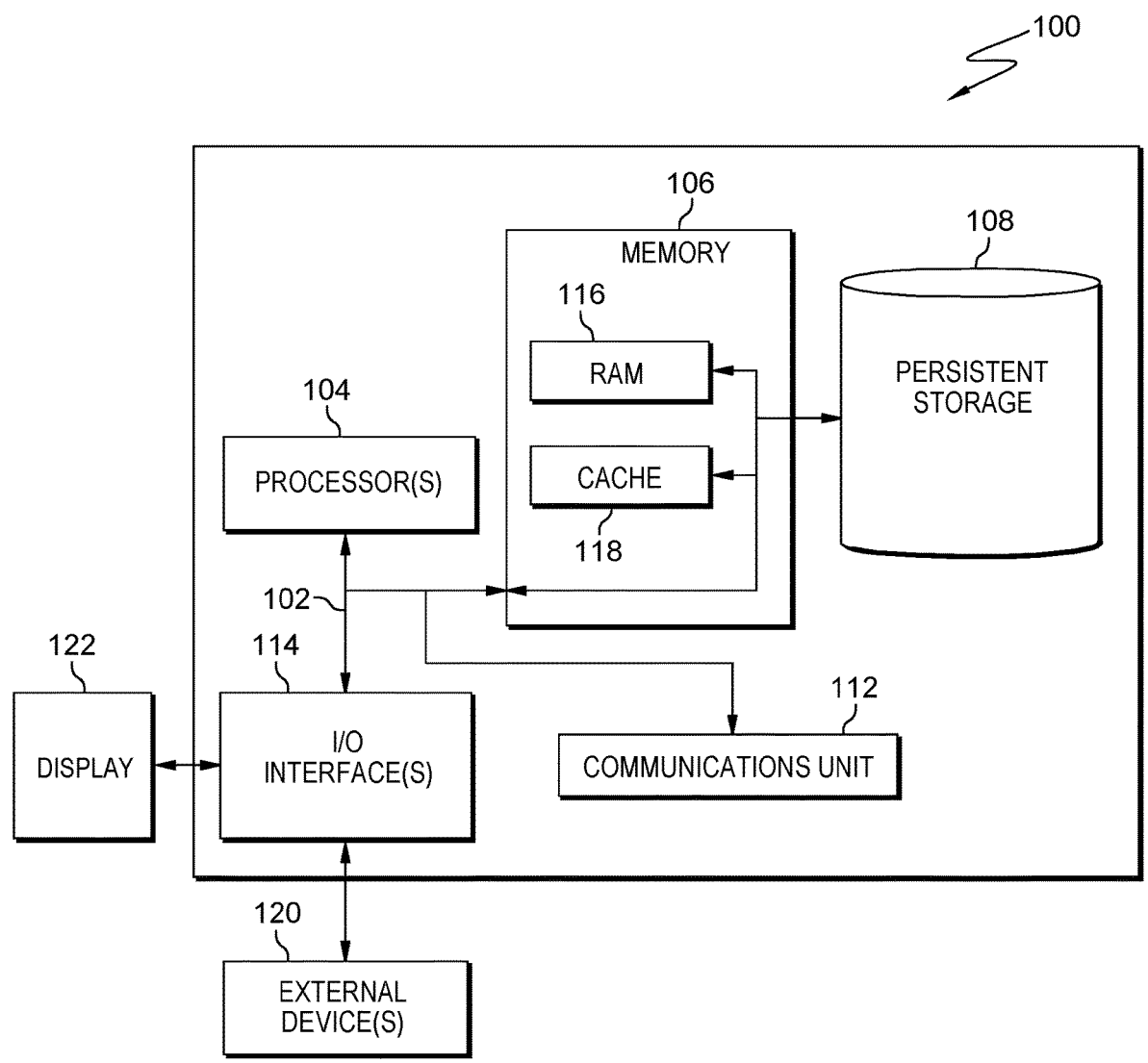
FIG. 1 is a block diagram depicting components of a computer, generally designated 100, suitable for executing embodiments of the present invention.

The present invention relates to information technology, and more specifically to information technology ticketing systems.

There are usually three stages for a ticket in an information technology ticket system: creating a ticket, routing the ticket, and closing the ticket (e.g., based on resolving an issue associated with the ticket). In the first stage, a user (such as a product developer, a tester or a customer) may create a ticket to describe functions, bugs or demands for a product or service. It may be desirable if the ticket system assists the user during the creation of the ticket. For example, when the user is creating the ticket, if the ticket system knows that there are other similar or related tickets as the newly created ticket, the ticket system may provide reference information to the user to facilitate the creation of the new ticket.

In the second stage, the ticket is routed or otherwise assigned to a suitable department/team for subsequent processing. For example, a customer demand ticket may be assigned to a customer service department to resolve the customer's issues. In another example, a bug ticket may be assigned to a product development department for debugging. The routing and resolution of the customer's issues associated with the ticket is usually done manually by analyzing the information described in the ticket and determining a suitable department/team for subsequent processing. Embodiments of the present invention recognize that determining the proper route may be time consuming and the final routing destination is often incorrect or suboptimal. Accordingly, embodiments of the present invention recognize that it may be desirable if the ticket system provides ticket routing recommendations (e.g., recommending candidate departments/teams for handling the ticket), or automatically routes tickets to a team/person who is the best suitable for dealing with the issues described in the ticket. Similarly, for the third stage, embodiment of the present invention recognize that it may be desirable if the ticket system automatically provides ticket resolution recommendations or resolves the ticket by automatically addressing and/or fixing any customer issues indicated in the ticket.

According to an embodiment of the present disclosure, there is provided a system for insert performance improvement. The system may comprise one or more processors and a memory coupled to at least one of the one or more processors. The system may further comprise a set of computer program instructions stored in the memory and executed by at least one of the one or more processors in order to perform an action of extracting media data from a ticket of a ticket system. The system may further comprise a set of computer program instructions stored in the memory and executed by at least one of the one or more processors in order to perform an action of extracting a plurality of data elements from the media data. The system may further comprise a set of computer program instructions stored in the memory and executed by at least one of the one or more processors in order to perform an action of generating a ticket knowledge graph for assisting ticket management based on the plurality of data elements, wherein a node of the knowledge graph represents a data element, and an edge between a first node and a second node in the ticket knowledge graph represents a correlation between a first data element represented by the first node and a second data element represented by the second node.

According to another embodiment of the present disclosure, there is provided a computer program product. The computer program product may comprise a computer readable storage medium having program instructions embodied therewith. The program instructions may be executable by a device to perform a method. The method may comprise extracting media data from a ticket of a ticket system. The method may further comprise extracting a plurality of data elements from the media data. The method may further comprise generating a ticket knowledge graph for assisting ticket management based on the plurality of data elements, wherein a node of the knowledge graph represents a data element, and an edge between a first node and a second node in the ticket knowledge graph represents a correlation between a first data element represented by the first node and a second data element represented by the second node.

According to embodiments of the present invention, a ticket knowledge graph is generated based on information included in one or more information technology tickets. Various media data (e.g., text data, image data, video data, audio data, URL data) associated with a ticket are identified, and the identified media data is segmented into one or more data elements. The respective data elements may be visually displayed in a ticket knowledge graph as one or more nodes. The edges between nodes of the ticket knowledge graph are further indicative of correlations between data elements represented by the nodes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Referring now to various embodiments of the invention in more detail, FIG. 1 is a functional block diagram depicting components of a computing device, generally designated 100, suitable for executing embodiments of the present invention. Computing device 100 includes one or more processor(s) 104 (including one or more computer processors), communications fabric 102, memory 106 including, RAM 116 and cache 118, persistent storage 108, communications unit 112, I/O interface(s) 114, display 122, and external device(s) 120. It should be appreciated that FIG. 1 provides only an illustration of one embodiment and does not imply any limitations with regard to the environments in which different embodiments may be implemented. Many modifications to the depicted environment may be made.

As depicted, computing device 100 operates over communications fabric 102, which provides communications between computer processor(s) 104, memory 106, persistent storage 108, communications unit 112, and input/output (I/O) interface(s) 114. Communications fabric 102 can be implemented with any architecture suitable for passing data or control information between processor(s) 104 (e.g., microprocessors, communications processors, and network processors), memory 106, external device(s) 120, and any other hardware components within a system. For example, communications fabric 102 can be implemented with one or more buses.

Memory 106 and persistent storage 108 are computer readable storage media. In the depicted embodiment, memory 106 includes random-access memory (RAM) 116 and cache 118. In general, memory 106 can include any suitable volatile or non-volatile one or more computer readable storage media.

Program instructions can be stored in persistent storage 108, or more generally, any computer readable storage media, for execution by one or more of the respective computer processor(s) 104 via one or more memories of memory 106. Persistent storage 108 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 112, in these examples, provides for communications with other data processing systems or devices. In these examples, communications unit 112 can include one or more network interface cards. Communications unit 112 may provide communications through the use of either or both physical and wireless communications links. In the context of some embodiments of the present invention, the source of the various input data may be physically remote to computing device 100 such that the input data may be received, and the output similarly transmitted via communications unit 112.

I/O interface(s) 114 allows for input and output of data with other devices that may operate in conjunction with computing device 100. For example, I/O interface(s) 114 may provide a connection to external device(s) 120, which may be as a keyboard, keypad, a touch screen, or other suitable input devices. External device(s) 120 can also include portable computer readable storage media, for example thumb drives, portable optical or magnetic disks, and memory cards. Software and data used to practice embodiments of the present invention can be stored on such portable computer readable storage media and may be loaded onto persistent storage 108 via I/O interface(s) 114. I/O interface(s) 114 also can similarly connect to display 122. Display 122 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
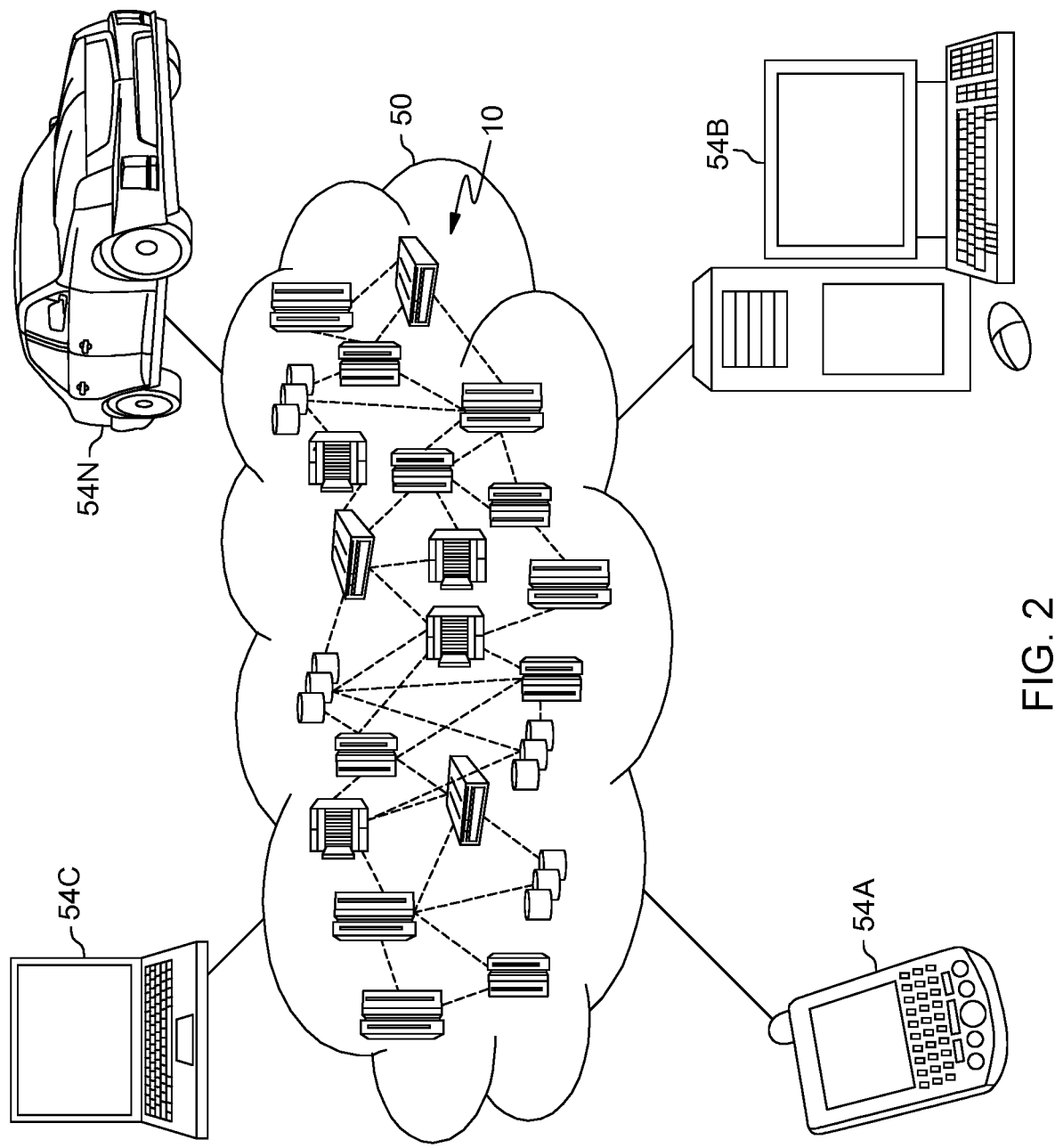
FIG. 2 is a block diagram depicting a cloud computing environment, generally designated 50, in accordance with at least one embodiment of the present invention.

FIG. 2 is a block diagram depicting a cloud computing environment, generally designated 50, in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
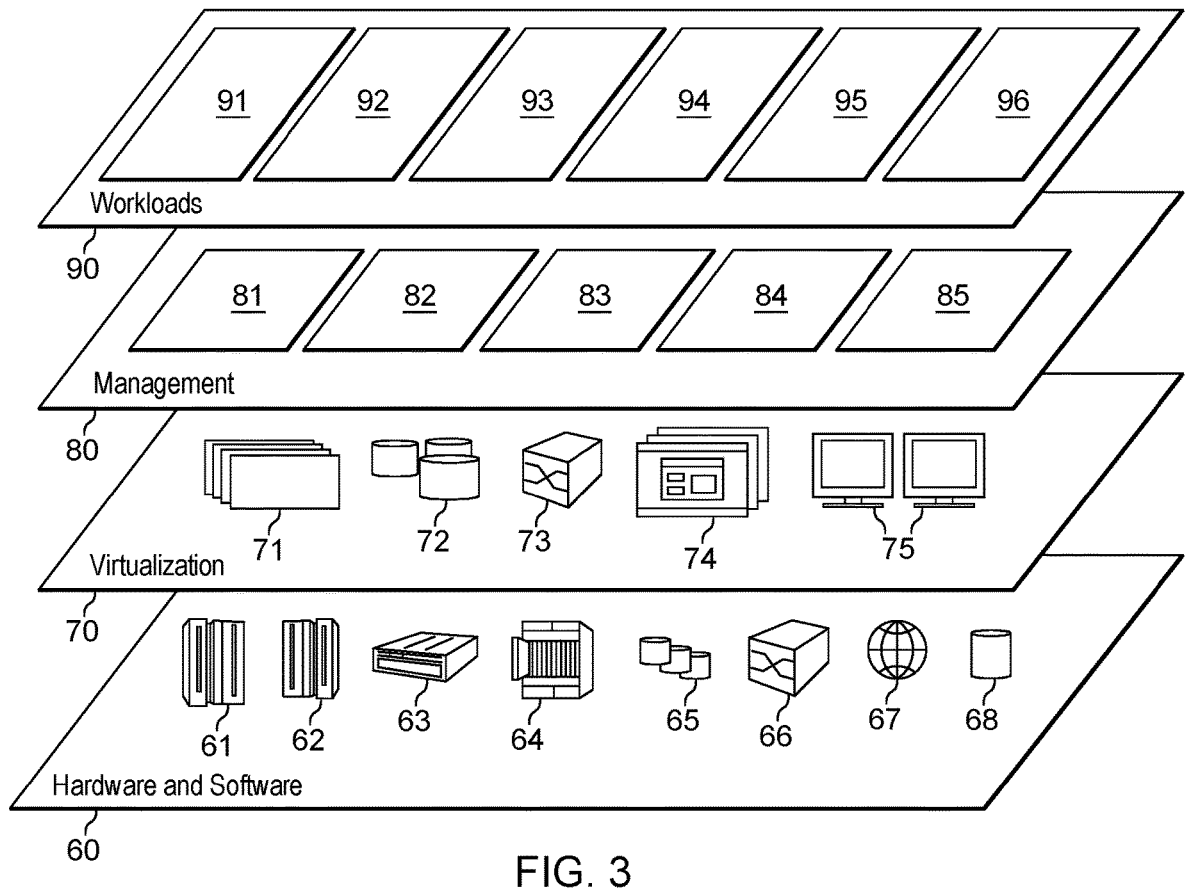
FIG. 3 is block diagram depicting abstraction model layers provided by cloud computing environment 50 of FIG. 2 in accordance with at least one embodiment of the present invention.

FIG. 3 is block diagram depicting a set of functional abstraction model layers provided by cloud computing environment 50 depicted in FIG. 2 in accordance with at least one embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ticket knowledge graph enhancement 96.

Figure 4:
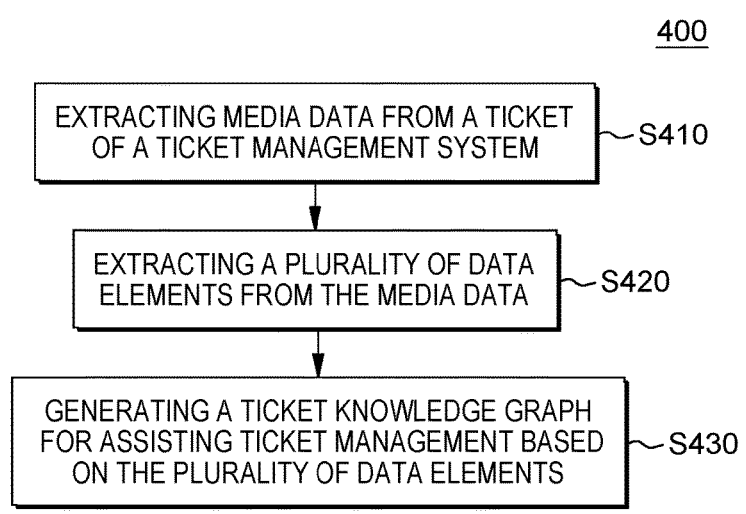
FIG. 4 depicts a flow chart of an exemplary computer-implemented method for ticket knowledge graph enhancement, generally designated 400, in accordance with at least one embodiment of the present invention.

FIG. 4 is a flowchart diagram depicting a computer-implemented method for ticket knowledge graph enhancement, generally designated 400, in accordance with at least one embodiment of the present invention. It should be noted that the term "ticket" as used herein may include any type of information technology ticket, including, but not limited to, an epic ticket, a story ticket, a bug ticket, or a customer demand ticket. It should be further noted that the term "media data" as used herein may include any form of physical or digital data associated with a ticket, including, but not limited to, text data, image data, video data, audio data, and URL data.

At step S410, media data associated with a ticket created by a ticket management system is extracted. At step 420, a plurality of data elements are extracted from the media data. At step 430, a ticket knowledge graph for assisting the ticket management system is generated based on the plurality of data elements extracted from the media data. In an embodiment, a node in the ticket knowledge graph represents a data element, and an edge between two nodes represents a correlation between two nodes.

FIG. 5 depicts an information technology ticket, generally designated 500, in accordance with at least one embodiment of the present invention. It should be appreciated that FIG. 5 provides only an illustration of one embodiment and does not imply any limitations with regard to the environments in which different embodiments may be implemented. Many modifications to the depicted environment may be made.

As depicted, information technology ticket 500 is a bug ticket describing a software bug resulting from the installation of a mobile application (APP) named "MMM". Information technology ticket 500 includes a title portion 502, a detail portion 504, a description portion 506, and an attachment portion 508.

Title portion 502 describes the title or main topic of the bug ticket. Detail portion 504 describes the details related to information technology ticket 500, including, but not limited to, the type, priority, and status of the ticket. Description portion 506 describes the particular issues associated with the software bug. Attachment portion 508 includes attachments related to information technology ticket 500, such as a video attachment 510 and an image attachment 512.

In an embodiment, data included in title portion 502, detail portion 504, description portion 506, and attachment portion 508 of information technology ticket 500 corresponds to the media data as previously described with respect to step S410. For example, the media data includes textual data, image data, and video data. Description portion 506 further includes a URL 514. In an embodiment, in addition to these types of media data, information technology ticket 500 may also include other forms of media data, such as audio data (e.g., the audio included in video attachment 510) or any other types of generally known media data.

In some embodiments, information technology ticket 500 may be created and submitted to a ticket system. The ticket system may analyze and extract the media data in the ticket. In some embodiments, the extracting in step S410 may be performed after the ticket is fully created. In some other embodiments, the extracting in step S410 may be performed while the user is creating the ticket. For example, the extracting in step S410 may be performed in real time when the user is inputting information into the ticket.

In some embodiments, for text data included in information technology ticket 500, data elements are extracted by splitting the text data based on punctuations. For example, the text shown in detail portion 506 of FIG. 5 may be split and extracted based on punctuations, so that each extracted data element includes only text but no punctuations. Accordingly, the extracted data elements of the text in detailed portion 506 may be "when first time install MMM mobile app", "after login", "after load navigator", "'Assist' app is enabled at first time", "then disabled(downloading)", "then enabled again(complete download)", "if user click 'Assist' at first enabled time", "a bad page is shown 'not exist'", "In other word", "navigator not disabling the apps fast enough", "if user taps in before its downloaded", and "get error".

In some embodiments, the text data included in information technology ticket 500, data elements are extracted based on conjunctions in the text data, such as "after", "when", "before", "first time", because different conjunctions usually indicate different actions or entities in the text data. By splitting the text data based on conjunctions, the text data may be split into smaller data fragments for subsequent processing. In some embodiments, data elements may be extracted based on both punctuations and conjunctions included in the text data.

In some embodiments, for image data included in information technology ticket 500, data elements are extracted based on image recognition and feature detection. For example, for an image showing a graphical user interface (GUI), a plurality of user interface (UI) components (such as input box, check box, back button, disable button, etc.) may be detected in the image, and each UI component may be extracted as a data element of the image. It should be noted that the data elements are not limited to UI components, other data elements (such as objects, persons, etc.) may be extracted from the image.

In some embodiments, for image data, such as video data included as a video attachment, the video data is into a plurality of separate video frames or images. For example, if the video data is a recording of UI operations on a GUI, the video data may be split based on different pages of the GUI. In this example, the split video data may correspond to one page and the individual video frames of the video data may correspond to individual images. Based on the preceding example, data elements may then be extracted from the individual images derived from the video data in a similar manner as for the image data previously discussed above.

In some embodiments, for audio data, such as audio data included as an audio attachment or audio data included in a video attachment, the audio is first converted to text (e.g., using speech to text software) and then data elements are extracted from the text in a similar manner as for text data previously discussed above.

In some embodiments, for URL data, the URL address (such as URL 514 shown in FIG. 5 with respect to information technology ticket 500) may be treated as text data. A domain name, query, or parameters related to the URL address may be extracted as separate data elements. Further, the content linked to the URL may be obtained, for example, by a Web crawler. The content linked to the URL may include, but is not limited to, one or more of text data, image data, video data, audio data or additional URLs. Data elements may further be extracted from any content linked to a URL based on the particular data content form and in a similar manner to any methods previously described above.

Figure 6:
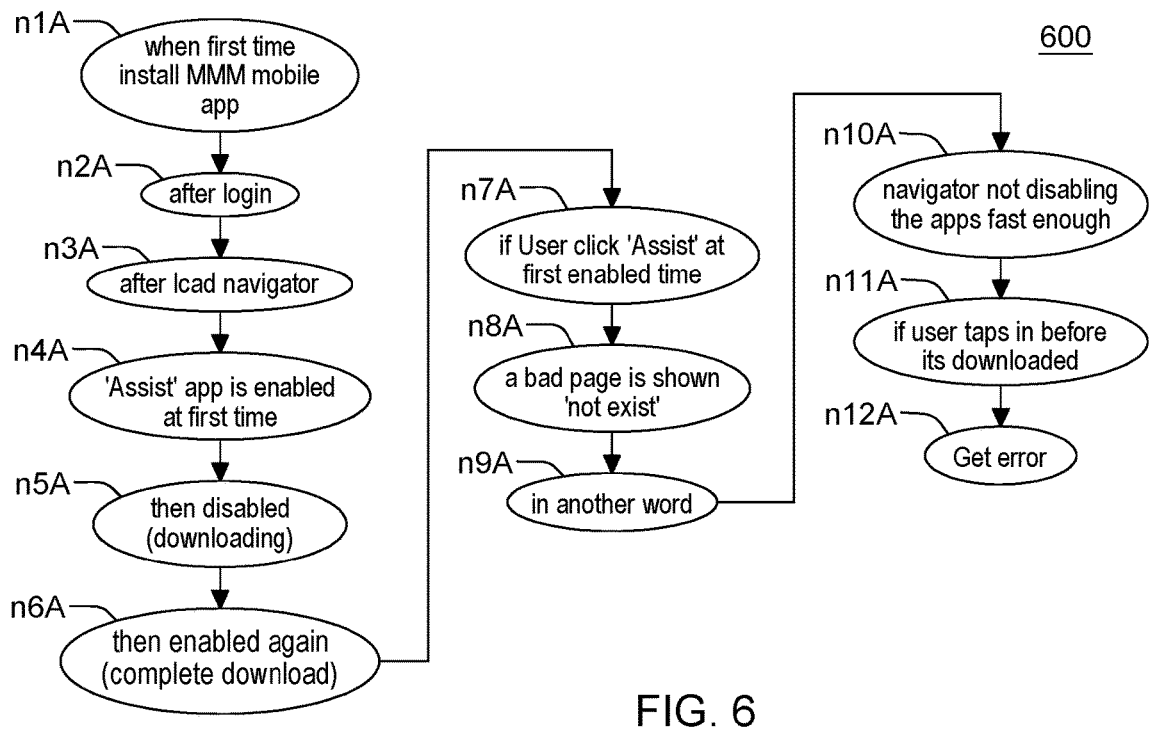
FIG. 6 depicts a ticket knowledge graph, generally designated 600, in accordance with at least one embodiment of the present invention.

FIG. 6 depicts an exemplary ticket knowledge graph, generally designated 600, in accordance with at least embodiment of the present invention. As depicted in FIG. 6, exemplary ticket knowledge graph 600 has been generated based on information technology ticket 500 of FIG. 5, and in accordance with the computer-implemented method of FIG. 4. More specifically, it can be inferred from information technology ticket 500 that a software navigator is not disabling applications fast enough and when a user attempts to open an application before its downloaded, the user receives an error. It should be appreciated that FIG. 6 provides only an illustration of one embodiment and does not imply any limitations with regard to the environments in which different embodiments may be implemented. Many modifications to the depicted environment may be made.

Exemplary ticket knowledge graph 600 includes nodes n1A-n12A (in the form of textual data). In order to generate nodes n1A-n12A of exemplary ticket knowledge graph 600, a plurality of media elements were extracted from information technology ticket 500. Further, a plurality of data elements were extracted from the plurality of media elements based on punctuations. The extracted data elements, represented as nodes n1A-n12A are as followed: n1A "when first time install MMM mobile app", n2A "after login", n3A "after load navigator", n4A "'Assist' app is enabled at first time", n5A "then disabled(downloading)", n6A "then enabled again(complete download)", n7A "if user click 'Assist' at first enabled time", n8A "a bad page is shown 'not exist'", n9A "In other word", n10A "navigator not disabling the apps fast enough", n11A "if user taps in before its downloaded", and n12A "get error".

As depicted, exemplary ticket knowledge graph has twelve nodes n1A-n12A, in which each node represents a data element extracted from information technology ticket 500. Further, the edge between two nodes represents the correlation between two data elements. For example, and as depicted in FIG. 6, the edges between two nodes show the word order of the text data in description portion 506 of information technology ticket 500, of which order was originally expressed by the punctuations and the arrangement of the sentences. It should be appreciated that by generating a ticket knowledge graph based on the data elements extracted from various media elements associated with an information technology ticket, the content in a ticket can be characterized in a meaningful manner such that the particular characteristics and inner correlations of respective data elements may be used to facilitate ticket management.

In an embodiment, a ticket knowledge graph may be generated based on a single ticket, one or more active tickets, and/or more closed tickets. In an embodiment, the ticket knowledge graph may be generated in real time while a user is creating a ticket, based, at least in part, on the media data being added by the user in the ticket. Thus, the ticket knowledge graph may support cold-boot scenarios and may be used to assist ticket management from the beginning of the ticket system process.

In an embodiment, a ticket knowledge graph may be generated based on a plurality of historical tickets, thereby giving a holistic view of similar problems and correlations between various information technology tickets. As such, as additional tickets are input into the ticketing system, the ticket knowledge graph may be updated accordingly.

The ticket knowledge graph of the disclosure may automatically be used by a ticket management system, without user intervention, for creating additional tickets, routing a ticket, and resolving or otherwise closing a ticket. For example, in the ticket creation stage, the ticket management system may search for similar or relevant tickets based, at least in part, on identifying reference information from the ticket knowledge graph. As another example, in the ticket routing stage, the ticket management system may generate routing recommendations based on information included in the ticket knowledge graph (e.g., recommending candidate departments/teams for handling the ticket), or automatically route the ticket to a team/person who is the best suitable for dealing with the issues described in the ticket based on information included in the ticket knowledge graph. In yet another example, the ticket management system may provide advice or recommendations for fixing a problem identified in the ticket by searching through the ticket knowledge graph for similar or related incidents associated with other tickets that have already been resolved.

Figure 7:
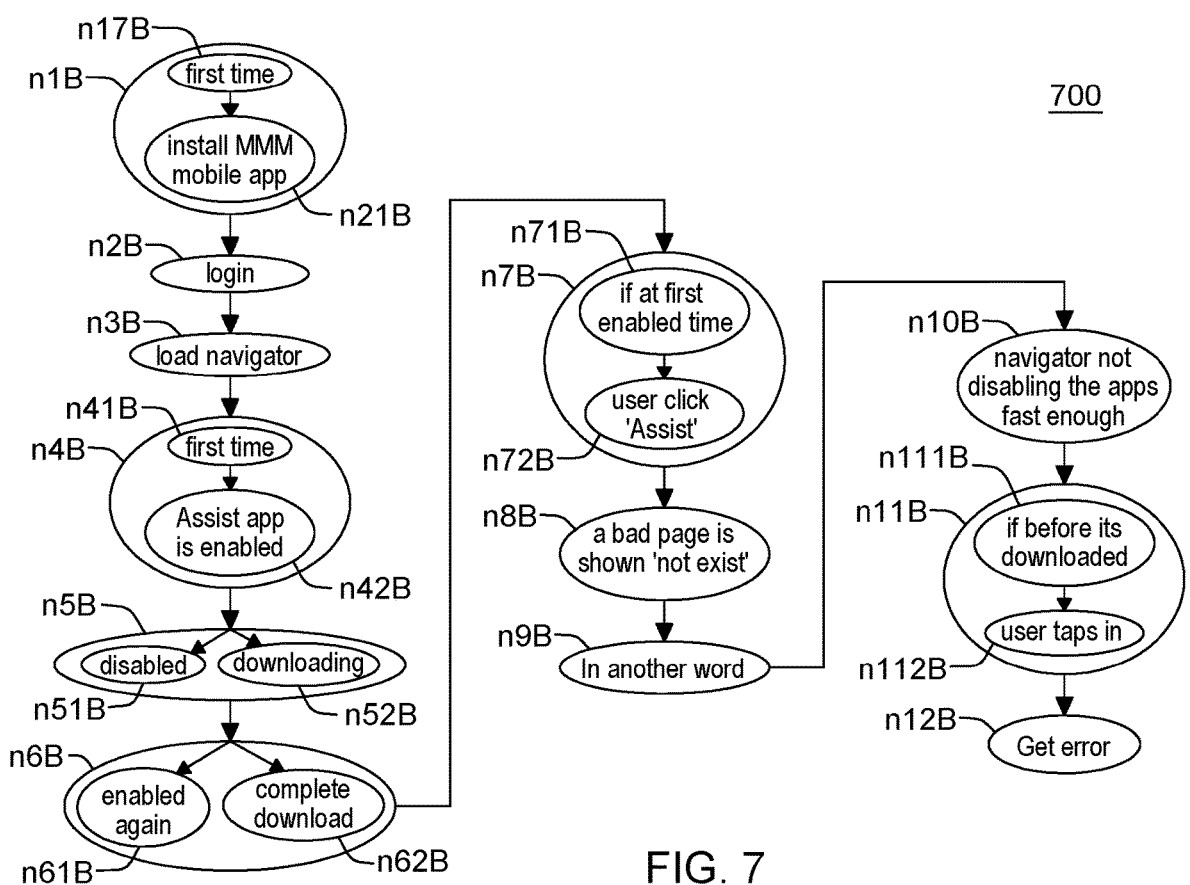
FIG. 7 depicts a hierarchical ticket knowledge graph, generally designated 700, in accordance with at least one embodiment of the present invention.

FIG. 7 depicts a hierarchical ticket knowledge graph, generally designated 700, in accordance with at least one embodiment of the present invention. More specifically, hierarchical ticket knowledge graph 700 has been generated from ticket knowledge graph 600 of FIG. 6 after subsequent hierarchical processes. It should be appreciated that FIG. 7 provides only an illustration of one embodiment and does not imply any limitations with regard to the environments in which different embodiments may be implemented. Many modifications to the depicted environment may be made.

Hierarchical ticket knowledge graph 700 includes a high-level graph and several low-level sub-graphs. The high-level graph represents data elements with a coarse information granularity and includes high level nodes n1B-n12B and corresponding edges. There are six low-level sub-graphs corresponding to high-level nodes n1B, n4B, n5B, n6B, n7B and n11B respectively, and each of these high-level nodes further includes several low-level nodes (e.g., n17, n21, n41, n42, etc.) and their corresponding edges. The low-level sub-graphs represent data elements. By generating a hierarchical ticket knowledge graph according to embodiments of the present invention, a hierarchical ticket knowledge graph with different information granularities is achieved.

For example, for node n1A in FIG. 6 representing the data element "when first time install MMM mobile app", this data element contains relatively rich information and may be further split into multiple data sub-elements. The split may be performed based on conjunctions in the data element, such as "after", "when", "before", "and first time". For example, the data element represented by n1A may be split into two data sub-elements "when first time" and "install MMM mobile app". Accordingly, a ticket knowledge sub-graph for node n1A may be generated based on these two data sub-elements. As shown in FIG. 7, the ticket knowledge sub-graph for node n1B includes two sub-nodes: n17B "first time" and n21B "install MMM mobile app". Further depicted is an edge between n11B to n12B that represents the correlation between these two data sub-elements.

For other nodes in the ticket knowledge graph 600 of FIG. 6, similar hierarchical processing may be performed on each node to obtain the hierarchical ticket knowledge graph 700 as shown in FIG. 7. As depicted by hierarchical ticket knowledge graph 700 of FIG. 7, for nodes n1B, n4B, n5B, n6B, n7B and n11B, ticket knowledge sub-graphs are generated. However, since the data elements represented by the other nodes are simple and may only correspond to a single action or entity, the generation of sub-graphs for these simpler graphs is not required.

In some embodiments, the conjunctions in the data elements may be omitted since the edges may represent the correlation in of itself. For example, in comparing n2B of hierarchical ticket knowledge graph 700 to node n2A of ticket knowledge graph 600, the conjunction "after" is omitted since the edge from node n1B to node n2B may represent the correlation expressed by this conjunction. Similarly, the conjunctions in node n11B, n3B, n51B, n61B are omitted in hierarchical ticket knowledge graph 700 in order to simply or otherwise improve the readability of hierarchical ticket knowledge graph 700.

It should be noted that hierarchical ticket knowledge graph 700 may be configured to include more than two levels according to actual requirements. Further, it should be appreciated that ticket knowledge graph 600 and hierarchical ticket knowledge graph 700 can be generated from data elements extracted from one or more different types of media data (e.g., image data, video data, etc.).

Figure 8:
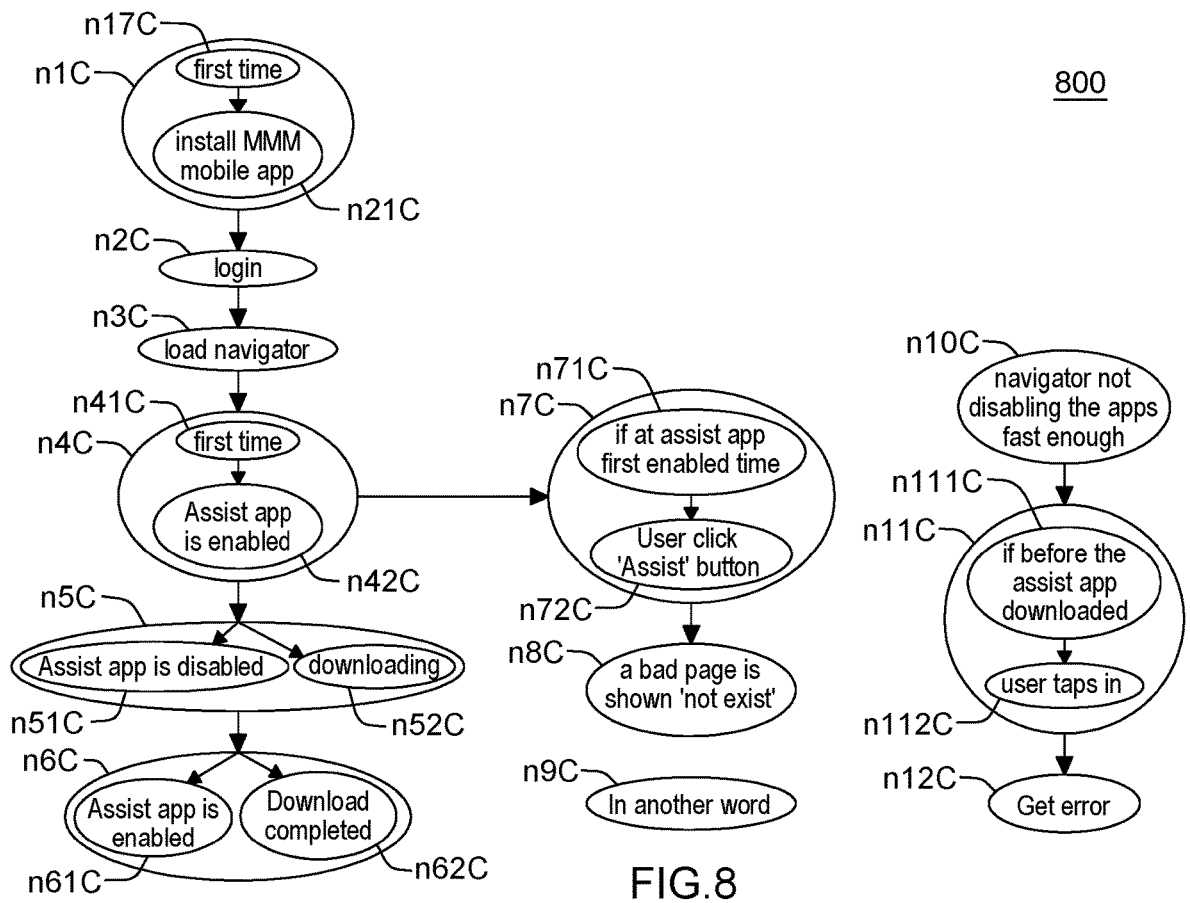
FIG. 8 depicts a semantic ticket knowledge graph, generally designated 800, in accordance with at least one embodiment of the present invention.

FIG. 8 depicts a semantic ticket knowledge graph, generally designated 800, in accordance with at least one embodiment of the present invention. More specifically, semantic ticket knowledge graph 800 has been generated from hierarchical ticket knowledge graph 700 of FIG. 7 after subsequent semantic analysis processes. It should be appreciated that FIG. 8 provides only an illustration of one embodiment and does not imply any limitations with regard to the environments in which different embodiments may be implemented. Many modifications to the depicted environment may be made.

Semantic ticket knowledge graph 800 illustrates semantic correlations between two nodes with respect to nodes n1C-n-12C. In some embodiments, semantic correlations between two nodes are generated based on performing a semantic analysis on the respective data elements represented by two nodes. In an embodiment, the semantic analysis is performed using attention-based semantic analysis models, including, but not limited to, hard attention models, soft attention models, global attention models, and local attention models. However, any generally known semantic analysis models may be used to update a ticket knowledge graph.

In some embodiments, the semantic analysis may be performed on the ticket knowledge graph to perform a graph semantic correction on the ticket knowledge graph. In some embodiments, a semantic analysis is performed in order to remove redundant data elements, supplement additional information associated with data elements, and/or to adjust the word order of data elements for improved correlations between nodes. For example, node n51C of semantic ticket knowledge graph 800 represents that data element "Assist app is disabled", which is formed from a combination of node 42B and node 51B of hierarchical ticket knowledge graph 700 of FIG. 7. Similar combinations are illustrated with respect to nodes n61C, n71C, n111C. As another example, the word order of node 62B is adjusted from "complete download" as shown in FIG. 7 to "download complete" as shown node 62C in FIG. 8.

In some embodiments, a ticket knowledge graph may further be updated based on the semantic correlations of the plurality of nodes as a whole. For example, assume it is determined that there is a strong semantic correlation between nodes n4B and n7B of hierarchical ticket knowledge graph 700. Based on this determination, a new edge between node n4C and node n7C is added in semantic ticket knowledge graph 800. As another example, assume it is determined that node n9B is not semantically correlated with any other nodes in hierarchical ticket knowledge graph 700. Based on this determination, the edge before and after node n9C is deleted from semantic ticket knowledge graph 800.

In some embodiments, a criterion may be designated by a user for updating a ticket knowledge graph. In an embodiment, the ticket knowledge graph may be updated based on the semantic correlations of the plurality of nodes if a correlation between a parent node and a child node is higher than a semantic correlation between two sibling nodes. For example, the update may be performed to maximize the variance between nodes. In doing so, the ticket knowledge graph may be updated in order to present the content in the ticket in more precise and concise manner.

Figure 9:
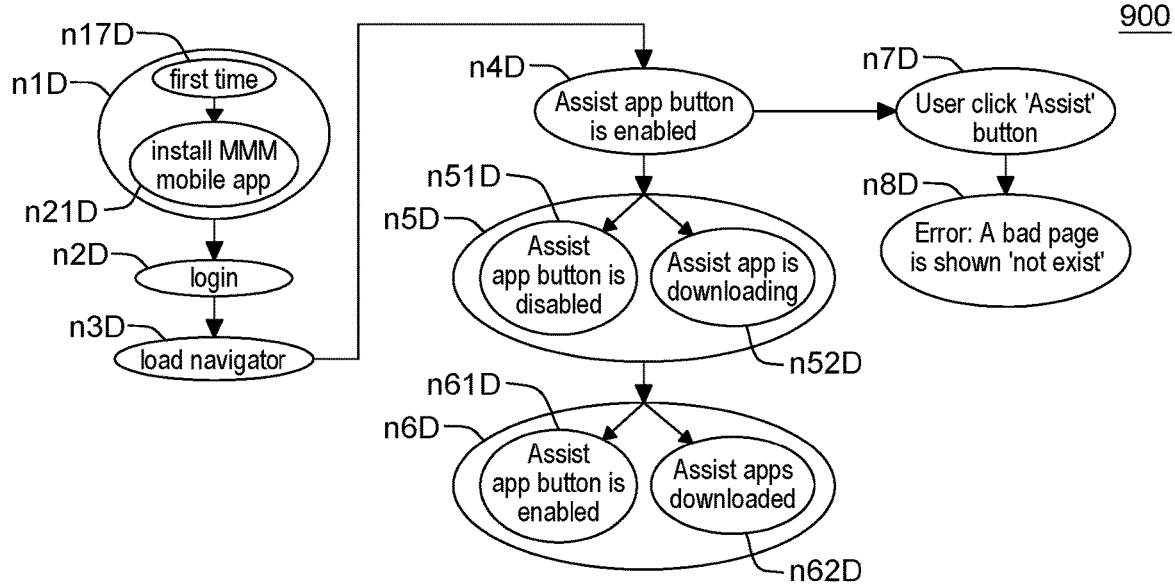
FIG. 9 depicts an updated ticket knowledge graph, generally designated 900, in accordance with at least one embodiment of the present invention.

FIG. 9 depicts an updated ticket knowledge graph, generally designated 900, in accordance with at least one embodiment of the present invention. More specifically, updated ticket knowledge graph 900 has been generated from semantic ticket knowledge graph 800 of FIG. 8 after additional processing steps. It should be appreciated that FIG. 9 provides only an illustration of one embodiment and does not imply any limitations with regard to the environments in which different embodiments may be implemented. Many modifications to the depicted environment may be made.

As depicted by updated ticket knowledge graph 900, nodes n9C-n11C have been deleted from semantic ticket knowledge graph 800. For example, nodes n9C-n11C may have been deleted due to their weak semantic correlations (i.e., semantic correlations below a threshold correlation level) with other nodes. As further depicted by updated ticket knowledge graph 900, nodes n41B and n71B have been deleted from hierarchical ticket knowledge graph 700 because they contained duplicate information. Additionally, as depicted by updated ticket knowledge graph 900, node n8C and node n12C of semantic ticket knowledge graph 800 have been combined to form node n8D of updated ticket knowledge graph 900. However, it should be noted that the criterion for updating the ticket knowledge graph is not limited to the above-described examples, and those skilled in the art can adopt different criteria according to actual conditions or needs.

In some embodiments, prior to generating a ticket knowledge graph, one or more preprocessing steps are performed in order to unify the various different types of media data associated with a ticket on a hierarchical and/or semantic level. In an embodiment, a "<conjunction>, <entity>, <action>" pattern may be used to unify different types of media data at a semantic level. For text based media data, a plurality of text data elements may be extracted. A natural language processing (NLP) may be performed to the text data elements to determine semantic representations of the respective text data elements. For example, the data elements "after login", "after load navigator", and "at first time" may be determined to be conjunctions, the data element "'assist' app" may be determined to be an entity, and the data element "is enabled" may be determined to be an action.

For image based media data, image data elements (such as UI components, objects, etc.) may be extracted. Image recognition and feature detection may be performed to determine semantic representations of the image data elements. For example, the image data elements may be semantically represented as "input box", "disabled button", "back button", and "check box" respectively, which may all be determined to be an entity.

For video based media data, a video may be split into a plurality of video frame, each video frame corresponding to one or more images. For example, a video recording of UI operations on a GUI may be split based on different pages displayed via the GUI. Each page displayed via the GUI may then be linked to a particular image. The page switching shown in the video data may be determined as a <conjunction> (e.g., "after", "before"). The tab switching within one page shown in the video data may be determined as a <conjunction> (e.g., "when"). In addition, the UI operations performed in the video data may be determined as an <action>, such as inputting username, inputting password, clicking login button, etc. Further, the UI component in the video data may be determined as an <entity>.

For other types of media data included in the ticket knowledge graph (e.g., audio data or URL data), the media data may be converted into text data or image data and similar hierarchical and/or semantic processes may be performed as previously described above.

In an embodiment, for each type of media data, a ticket knowledge graph may be generated based on the unified semantic representations of data elements extracted from the media data. For example, semantic representations related to <action> or <entity> may be displayed as nodes within a ticket knowledge graph, while the semantic representations related to <conjunction> may be determined as edges between respective nodes. In this manner, a single ticket knowledge graph that includes multiple types of media data elements or multiple ticket knowledge graphs that include a respective type of media data elements may be unified to have the same format and may be easily combined without duplicate information or the loss of information.

In some embodiments, an integrated ticket knowledge graph may be generated by combining the ticket knowledge graphs for different types of media data. During the generation of the integrated ticket knowledge graph, all types of media data included in the ticket may be fully used and analyzed, and thus the integrated ticket knowledge graph may characterize the ticket in a more comprehensive way.

It should be noted that according to actual needs, not all of the types of media data may be combined. For example, it is possible to choose two or more ticket knowledge graphs from ticket knowledge graphs for all the types of media data and combine them to generate an integrated ticket knowledge graph. In some embodiments, if preprocessing has been performed to provide a uniform format between different media elements, generating a distinct ticket knowledge graph for each type of media data elements may be omitted, and an integrated ticket knowledge graph may be generated directly based on the semantic representations of data elements associated with different media elements.

In some embodiments, when combining multiple ticket knowledge graphs having different data types into a single, integrated ticket knowledge graph, semantic integrities may be considered to decide which types of knowledge graphs should be combined first. For example, for each of a plurality of ticket knowledge graphs (such as a video graph, a text graph, an image graph, an audio graph and a URL graph), a semantic integrity of each ticket knowledge graph may be calculated based on a semantic dispersion and a semantic correlation of the nodes included in the ticket knowledge graph.

The semantic dispersion of the nodes may indicate the amount of content represented by the nodes, while the semantic correlation of the nodes may indicate the correlation of content represented by the nodes. The semantic dispersion and semantic correlation may be used together to indicate the integrity of the ticket knowledge graph. Further, weights for the semantic dispersion and semantic correlation may be flexibly designed according to actual conditions. Further, in some cases, at least one of the semantic dispersion or the semantic correlation may be used for evaluating the graph semantic integrity.

In some embodiments, the plurality of ticket knowledge graphs may be ranked based on the calculated on the respective semantic integrities of the plurality of ticket knowledge graphs. In an embodiment, the two ticket knowledge graphs with the highest semantic integrities may be combined to generate the integrated ticket knowledge graph.

For example, if a video based ticket knowledge graph has a semantic integrity of 0.9, a text based ticket knowledge graph has a semantic integrity of 0.8, an image based ticket knowledge graph has a semantic integrity of 0.7, an audio based ticket knowledge graph has a semantic integrity of 0.6, and a URL based ticket knowledge graph has a semantic integrity of 0.5, then an integrated video/text data ticket knowledge graph would be generated since the video and data based ticket knowledge graphs have the two highest semantic integrity scores, respectively.

In some embodiments, the video-text graph and the remaining image, audio, and URL based ticket knowledge graphs may be further ranked based on an updated set of semantic integrities. For example, combining the video based ticket knowledge graph and the text based ticket knowledge graph into an integrated video/text data ticket knowledge graph may result in the semantic integrity of the integrated ticket knowledge graph being increased to 1.0. The ticket knowledge graphs with the two highest scores (e.g., the integrated video/text data ticket knowledge graph (integrity score of 1.0) and the image data ticket knowledge graph (integrity score of 0.7) are again combined to form a video/text/image data ticket knowledge graph.

It should be noted that any number of different types of media data ticket knowledge graphs may be combined into a single integrated ticket knowledge graph. For example, an integrity threshold may be set and only the ticket knowledge graph types with integrities higher than the integrity threshold will be combined as an integrated ticket knowledge graph. Further, other ways for choosing two or more graph types from the plurality of ticket knowledge graph for combination may also be possible.

In some embodiments, the integrated ticket knowledge graph may also undergo additional processing steps, such as hierarchical processing and semantic analysis processing as previously described above.

It should be appreciated that embodiments of the present invention allow for continuous adjustments and updates to be made to currently generated ticket knowledge graphs based on the addition of newly created tickets and/or ticket knowledge graphs. Accordingly, ticket knowledge graphs may be adjusted continuously or in real-time based on newly created tickets and/or ticket knowledge graphs so as to better manage the tickets of the ticket management system. Furthermore, during the creation of a new ticket, the ticket management system may use the existing ticket knowledge graph(s) to automatically provide reference information, without user intervention, to a user to facilitate the creation of the ticket.

In some embodiments, a core semantic data element may be extracted from a new ticket. For example, the extracted core semantic data element may be "install MMM app". In an embodiment, one or more candidate nodes having the most similar semantic correlations or semantic correlations above a predetermined threshold with the new ticket may be searched in an existing ticket knowledge graph based on semantic analysis on the new ticket and data elements represented by the nodes in the existing ticket knowledge graph. For example, the node n12C (representing "install MMM mobile app") of updated ticket knowledge graph 900 of FIG. 9 may be searched as a candidate node since it has a similar semantic correlation with the core semantic data element "install MMM app" included in the new ticket. The node n12C together with other semantically relevant nodes or tickets may further be provided to the user who created the new ticket.

In some embodiments, searching for candidate nodes may be performed hierarchically. For example, searching for candidate nodes may only be performed for high-level nodes, such as nodes n1D-n8D of updated ticket knowledge graph 900. In this example, if the high-level node n1D is determined to have the most similar semantic correlation with the new ticket, a sub-graph for the high-level node n1D (including low-level nodes n17D and n21D) may be provided to the user who created the new ticket. By performing hierarchical searching using the hierarchical structure of the ticket knowledge graph, the searching efficiency may be increased compared to a traversal search for every node in the graph.

In some embodiments, more than one candidate node may be found in the ticket knowledge graph. In this case, for each respective sub-graph associated with a candidate node, the semantic correlation between the new ticket and the sub-graph may be further calculated. In an embodiment, the sub-graph having the highest semantic correlation with the newly created ticket is further provided to the user for reference.

In some embodiments, a new ticket knowledge graph may need to be generated for a newly created ticket in order to calculate the semantic correlation between the newly created ticket and the sub-graph. The semantic correlations between the nodes in the new ticket and the nodes in the sub-graph may be calculated, and the sum of the semantic correlations between nodes may be determined as the semantic correlation between the new ticket and the sub-graph.

In some embodiments, during the creation of a new ticket, the ticket management system may use an existing ticket knowledge graph automatically update or populate information, without user intervention, during ticket creation. For example, a user may be creating a ticket by inputting the title "Assist and Parts Identifier apps is enabled-disabled-enabled in navigator app list when first time use" in title portion 502 of information technology ticket 500 of FIG. 5, while other media data are not input into the ticket. The core semantic information of the title may be extracted and used for determining candidate nodes by searching for an existing ticket knowledge graph based on semantic analysis. In doing so, the ticket management system may assist in the creation of the new ticket in real time before the new ticket is fully created by the user.

What is claimed is:

1. A computer-implemented method, comprising:
   extracting, by one or more processors, media data from an information technology ticket;
   extracting, by one or more processors, a plurality of data elements from the media data;
   generating, by one or more processors, a ticket knowledge graph based on the plurality of data elements, wherein a node of the ticket knowledge graph represents a data element, and an edge between a first node and a second node in the ticket knowledge graph represents a correlation between a first data element represented by the first node and a second data element represented by the second node;
   calculating, by one or more processors, a semantic correlation between two nodes of the ticket knowledge graph based, at least in part, on a semantic analysis of respective data elements represented by the two nodes; and
   updating, by one or more processors, the ticket knowledge graph based on the semantic correlation between the two nodes, wherein a first semantic correlation between a parent node and a child node is higher than a second semantic correlation between two sibling nodes.

2. The computer-implemented method of claim 1, wherein the media data includes text data, and the plurality of data elements are extracted based on conjunctions in the text data.

3. The computer-implemented method of claim 1, wherein the media data includes video data, and the plurality of data elements are extracted based a set of video frames corresponding to the video data.

4. The computer-implemented method of claim 1, further comprising:
   extracting, by one or more processors, a plurality of data elements from the media data;
   determining, by one or more processors, a plurality of semantic representations of the respective data elements, wherein the plurality of semantic representations include at least one of a conjunction, an entity and an action;
   generating, by one or more processors, an additional ticket knowledge graph based on the plurality of semantic representations; and
   generating, by one or more processors, an integrated ticket knowledge graph based, at least in part, on combining the ticket knowledge graph and the additional ticket knowledge graph.

5. The computer-implemented method of claim 4, wherein combining the ticket knowledge graph and the additional ticket knowledge graph further includes:
   calculating, by one or more processors, a respective semantic integrity of the ticket knowledge graph and one or more additional ticket knowledge graphs based on at least one of a semantic dispersion or a semantic correlation of respective nodes included in the ticket knowledge graph and the one or more additional ticket knowledge graphs;
   ranking, by one or more processors, the one or more additional ticket knowledge graphs based on respective calculated semantic integrities of the one or more additional ticket knowledge graphs; and
   combining, by one or more processors, the ticket knowledge graph and the additional ticket knowledge graph having with the highest semantic integrity.

6. The computer-implemented method of claim 4, further comprising:
   calculating, by one or more processors, a semantic correlation between two nodes of the integrated ticket knowledge graph based, at least in part, on semantic representations of the respective data elements represented by the two nodes; and
   updating, by one or more processors, the integrated ticket knowledge graph based, at least in part, on the semantic correlation between the two nodes, wherein semantic correlations between a parent node and a child node is higher than semantic correlations between two sibling nodes.

7. The computer-implemented method of claim 1, further comprising:
   generating, by one or more processors, a second ticket knowledge graph for a second information technology ticket; and
   integrating the second ticket knowledge graph with the ticket knowledge graph.

8. The computer-implemented method of claim 7, further comprising:
   identifying, by one or more processors, a candidate node in the ticket knowledge graph having a highest similar semantic correlation with the second information technology ticket based, at least in part, on performing a semantic analysis on the second information technology ticket and data elements represented by respective nodes in the ticket knowledge graph; and
   generating, by one or more processors, a sub-graph associated with the candidate node.

9. The computer-implemented method of claim 1, further comprising:
   splitting, by one or more processors, a data element into a plurality of data sub-elements; and
   generating, by one or more processors, a ticket knowledge sub-node based on the plurality of data sub-elements.

10. A computer system, comprising:
    one or more computer processors;
    one or more computer readable storage media; and
    computer program instructions, the computer program instructions being stored on the one or more computer readable storage media for execution by the one or more computer processors, and the computer program instructions including instructions to:
       extract media data from an information technology ticket;
       extract a plurality of data elements from the media data;
       generate a ticket knowledge graph based on the plurality of data elements, wherein a node of the ticket knowledge graph represents a data element, and an edge between a first node and a second node in the ticket knowledge graph represents a correlation between a first data element represented by the first node and a second data element represented by the second node;
       calculate a semantic correlation between two nodes of the ticket knowledge graph based, at least in part, on a semantic analysis of respective data elements represented by the two nodes; and
       update by one or more processors, the ticket knowledge graph based on the semantic correlation between the two nodes, wherein a first semantic correlation between a parent node and a child node is higher than a second semantic correlation between two sibling nodes.

11. The computer system of claim 10, further comprising program instructions to:
    determine a plurality of semantic representations of respective data elements, wherein the plurality of semantic representations include at least one of a conjunction, an entity and an action;
    generate an additional ticket knowledge graph based on the plurality of semantic representations; and
    generate an integrated ticket knowledge graph based, at least in part, on combining the ticket knowledge graph and the additional ticket knowledge graph.

12. The computer system of claim 11, wherein the program instructions to combine the ticket knowledge graph and the additional ticket knowledge graph further include instructions to:
    calculate a respective semantic integrity of the ticket knowledge graph and one or more additional ticket knowledge graphs based on at least one of a semantic dispersion or a semantic correlation of respective nodes included in the ticket knowledge graph and the one or more additional ticket knowledge graphs;
    rank the one or more additional ticket knowledge graphs based on respective calculated semantic integrities of the one or more additional ticket knowledge graphs; and combine the ticket knowledge graph and the additional ticket knowledge graph having with the highest semantic integrity.

13. The computer system of claim 10, further comprising program instructions to:

split a data element into a plurality of data sub-elements; and generate a ticket knowledge sub-node based on the plurality of data sub-elements.

14. A computer program product, the computer program product comprising a computer readable storage medium and program instructions stored on the computer readable storage medium, the program instructions including instructions to:

extract media data from an information technology ticket;

extract a plurality of data elements from the media data;

generate a ticket knowledge graph based on the plurality of data elements, wherein a node of the ticket knowledge graph represents a data element, and an edge between a first node and a second node in the ticket knowledge graph represents a correlation between a first data element represented by the first node and a second data element represented by the second node; and calculate a semantic correlation between two nodes of the ticket knowledge graph based, at least in part, on a semantic analysis of respective data elements represented by the two nodes; and update by one or more processors, the ticket knowledge graph based on the semantic correlation between the two nodes, wherein a first semantic correlation between a parent node and a child node is higher than a second semantic correlation between two sibling nodes.

15. The computer program product of claim 14, further comprising program instructions to:

determine a plurality of semantic representations of respective data elements, wherein the plurality of semantic representations include at least one of a conjunction, an entity and an action;

generate an additional ticket knowledge graph based on the plurality of semantic representations; and generate an integrated ticket knowledge graph based, at least in part, on combining the ticket knowledge graph and the additional ticket knowledge graph.

16. The computer program product of claim 15, wherein the program instructions to combine the ticket knowledge graph and the additional ticket knowledge graph further include instructions to:

calculate a respective semantic integrity of the ticket knowledge graph and one or more additional ticket knowledge graphs based on at least one of a semantic dispersion or a semantic correlation of respective nodes included in the ticket knowledge graph and the one or more additional ticket knowledge graphs;

rank the one or more additional ticket knowledge graphs based on respective calculated semantic integrities of the one or more additional ticket knowledge graphs; and combine the ticket knowledge graph and the additional ticket knowledge graph having with the highest semantic integrity.

17. The computer program product of claim 14, further comprising program instructions to:

split a data element into a plurality of data sub-elements; and generate a ticket knowledge sub-node based on the plurality of data sub-elements.

* * * * *